(12) United States Patent
Simske et al.

(10) Patent No.: US 9,530,028 B2
(45) Date of Patent: Dec. 27, 2016

(54) IDENTIFIERS FOR MASS SERIALIZATION (71) Applicant: HEWLETT-PACKARD DEVELOPMENT COMPANY, L.P., Houston, TX (US)

(72) Inventors: Steven J Simske, Fort Collins, CO (US); Mark Jacobsen, Galway (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/654,969

(22) PCT Filed: Feb. 28, 2013

(86) PCT No.: PCT/US2013/028217
§ 371 (c)(1),
(2) Date: Jun. 23, 2015

(87) PCT Pub. No.: WO2014/133518
PCT Pub. Date: Sep. 4, 2014

(65) Prior Publication Data
US 2015/0356324 A1 Dec. 10, 2015

(51) Int. Cl.
G06K 19/06 (2006.01)
G06K 1/12 (2006.01)
G06F 17/30 (2006.01)
G06Q 10/08 (2012.01)

(52) U.S. Cl.
CPC ........... *G06K 1/12* (2013.01); *G06F 17/30495* (2013.01); *G06Q 10/087* (2013.01)

(58) Field of Classification Search
CPC ............ G06K 19/06; G06K 7/10; G06K 7/14; G06K 9/18; G06F 17/00

USPC ............... 235/494, 454, 375, 462.01, 462.09
See application file for complete search history.

(56) References Cited

U.S. PATENT DOCUMENTS

| 5,464,974 A | 11/1995 | Priddy et al. |
| 2004/0139018 A1 | 7/2004 | Anderson et al. |
| 2006/0022059 A1* | 2/2006 | Juds ........................ G06K 7/12 235/494 |

(Continued)

FOREIGN PATENT DOCUMENTS

| JP | 2001056706 A | 2/2001 |
| JP | 2005071149 A | 3/2005 |

(Continued)

OTHER PUBLICATIONS

Aegate, "Mass Serialisation in the European Pharmaceutical Industry", Jun 20, 2008.

(Continued)

Primary Examiner — Edwyn Labaze
(74) Attorney, Agent, or Firm — Dhand Law PC (57) ABSTRACT An example method includes generating a set of identifiers for a mass serialization; associating one or more of the identifiers of the set of identifiers with an object; and storing the set of identifiers and an association of the one or more identifiers with an object. Each identifier in the set of identifiers may have a representation of at least two different characters. The representation of each identifier in the set may have a predetermined length, and a number of one of the characters in the representation may be within a predefined range.

15 Claims, 4 Drawing Sheets (56) References Cited

U.S. PATENT DOCUMENTS

| | | | |
|---|---|---|---|
| 2006/0247778 A1* | 11/2006 | Ferree | A61F 2/442 623/17.14 |
| 2009/0307032 A1 | 12/2009 | Tribe et al. | |
| 2012/0254052 A1 | 10/2012 | Gao et al. | |
| 2013/0026241 A1* | 1/2013 | Sakahashi | G06K 19/06037 235/494 |
| 2013/0138491 A1* | 5/2013 | Gao | G06Q 30/0225 705/14.23 |
| 2013/0337477 A1* | 12/2013 | Kuhr | G01N 1/22 435/7.92 |
| 2014/0231522 A1* | 8/2014 | Miyasaka | G06K 1/121 235/462.1 |
| 2014/0263674 A1* | 9/2014 | Cerveny | G06K 19/06037 235/494 |

FOREIGN PATENT DOCUMENTS

| | | | |
|---|---|---|---|
| JP | 2008217266 A | 9/2008 | |
| JP | 2012048287 A | 3/2012 | |

OTHER PUBLICATIONS

Anticounterfeiting Protection in the Pharmaceutical Industry (Web Page).
Track and Trace and Serialisation.

* cited by examiner

IDENTIFIERS FOR MASS SERIALIZATION

BACKGROUND

Serialization is used to uniquely identify each of a large set of items. For example, bar codes may be used to identify retail items. Similarly, serial numbers on various products are used to identify each individual product in the set. Such identifiers may be applied to packaging material or may be applied to objects using labels or medallions, or even impressed or stamped on the object.

BRIEF DESCRIPTION OF THE DRAWINGS

For a more complete understanding of various examples, reference is now made to the following descriptions taken in connection with the accompanying drawings in which.

DETAILED DESCRIPTION

In various examples, a set of identifiers for mass serialization may be created for a set of items. The items may be any of a variety of items, such as items for retail sale, packaging or manufacturing, for example. In various examples, each identifier in the mass serialization set may have a representation, such as a binary representation. The representation of the identifiers may be of a predetermined length of characters such as letters or digits or, in the case of binary strings, a predetermined length of bits having a value of "0" or "1". In the various examples described herein, identifiers represented as binary strings are used. Those skilled in the art will appreciate that other types of representations are possible and are contemplated. In accordance with the disclosed examples, the number of a certain character in a representation of the identifier, such as the number of 1's in a binary string, may be within a predefined range. In some examples, the number of the certain character in the representation may be set at a different number at different stages of a serialization flow, such as from production to packaging to retail, for example.

Figure 1:
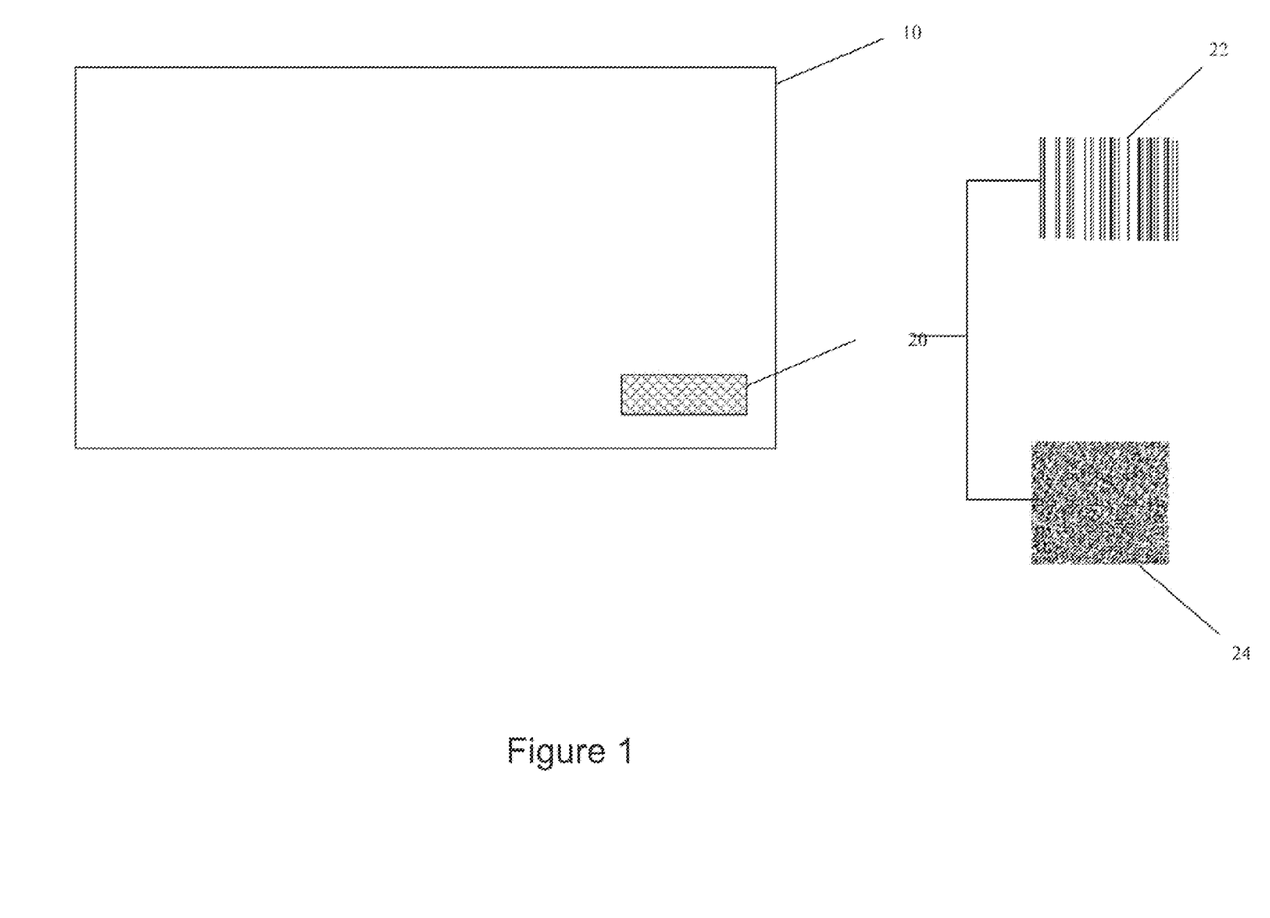
FIG. 1 illustrates an example object with a serialization identifier.

In various examples described herein, identifiers may be generated and/or used for mass serialization, such as for unique identification of a product. Referring now to FIG. 1, an example object 10 is illustrated with an example identifier 20. The object 10 may be any of a variety of objects, such as an object for retail sale, a component fir a larger assembly, etc. The identifier 20 may be any of a variety of identifiers, such as a bar code 22, a 2-D bar code such as a quick-response (QR) code 24, or the like. The identifier 20 may be used to identify various features of the product 10. For example, in the retail arena, the identifier 20 may be used to identify the type of product (e.g., brand, type and size of a box of cereal) to be used at the point of sale. In other examples, the identifier 20 may be used to uniquely identify each item in a set of items such as, for example, a serial number for each component in a set of identical components.

A set of identifiers for mass serialization may require a large number of unique identifiers. For example, a serial number may be assigned to each unit of a product for which a large number of units may be produced. Thus, each unit would be assigned a unique identifier.

A discussion of certain concepts is useful in understanding the various examples described herein. First, it is noted that the number of combinations ($C_{n,p}$) for selecting p items out of n items, where p and n are both non-negative integers and where $p \le n$, is defined as:

$$C_{n,p} = \binom{n}{p} = \frac{n!}{p!(n-p)!}$$

where n! is the factorial operator: $n! = n*(n-1)*(n-2)* \ldots *1$. By definition, $0! = 1$.

Serialization may provide a unique identifier to each of a plurality of items. For serialization, the number of serialization combinations is dictated by the base, b, of the character to be printed, raised to the power of N, the number of digits to be printed. For example, if the 26 uppercase and 26 lowercase English characters, along with the 10 numerals are used, then the base is 62, and the number of possible mass serialized values is $62^N$. In other examples, for a binary string, the base is 2. In general, the number of mass serialized values, $n_{MS}$, is given by:

$$n_{MN} = b^N$$

If the base of the serialization is a power of 2; that is, $b = 2^P$, then the number of mass serialized values is:

$$n_{MN} = 2^{PN}$$

Thus, the mass serialization may represents PN bits. If b is not a power of two, then:

$$n_{MN} = 2^{N \log_2 b}$$

Thus, in various examples, the serialization provides $N \log_2 b$ bits of data. For mapping to this serialization, then, the fractional portion of $N \log_2 b$ may be ignored, and the integer portion may represent the number of bits encoded into the N digits using the b-wide character set.

In various examples, the number of bits of data may represent the length of a binary representation of the serialization and may be set to a predetermined length (B). Further, in various examples, the number of 1's in the binary representation may be set within a predefined range. In one example, the length of the binary representation may be set at 40, and the number of 1's in the binary representation may be set between 18 and 22, as described below with reference to Table 1.

In the various examples described below, the number of 1's is set in a range defined by a lower number (L) of 1's (e.g., 18) and an upper number (U) of 1's (e.g., 22). Thus, the total number of allowed mass serialization values may be given by:

$$n_{MS} = \sum_{p=L}^{p=U} \binom{B}{p}$$

Conversely, the number of non-allowed mass serialization values may be given by:

$$n_{\overline{MS}} = \sum_{p=0}^{p=L-1} \binom{B}{p} + \sum_{p=U+1}^{p=B} \binom{B}{p}$$

Thus, the percentage of allowable mass serialization values are:

$$pct_{MS} = \frac{\sum_{p=L}^{p=U}\binom{B}{p}}{\sum_{p=0}^{p=B}\binom{B}{p}}$$

This ratio may be used to formulate a strategy to avoid any duplication of identifiers, referred to as a collision strategy. For example, a database of binary strings may be used for a static set of mass serialized numbers with between L and U 1's in the string. The same database may be used for a set of incremental information objects (or IIOs) which may accommodate a stage progression. In this regard, the number of 1's may change within the range defined by U and L at different stages. In various examples, the number of 1's may jump from less 1's to more 1's. For example, the serialization of a product may flow from manufacturing to packaging to retail. This serialization flow may be achieved through various types of IIOs, such as progressive barcodes, for example.

Figure 2:
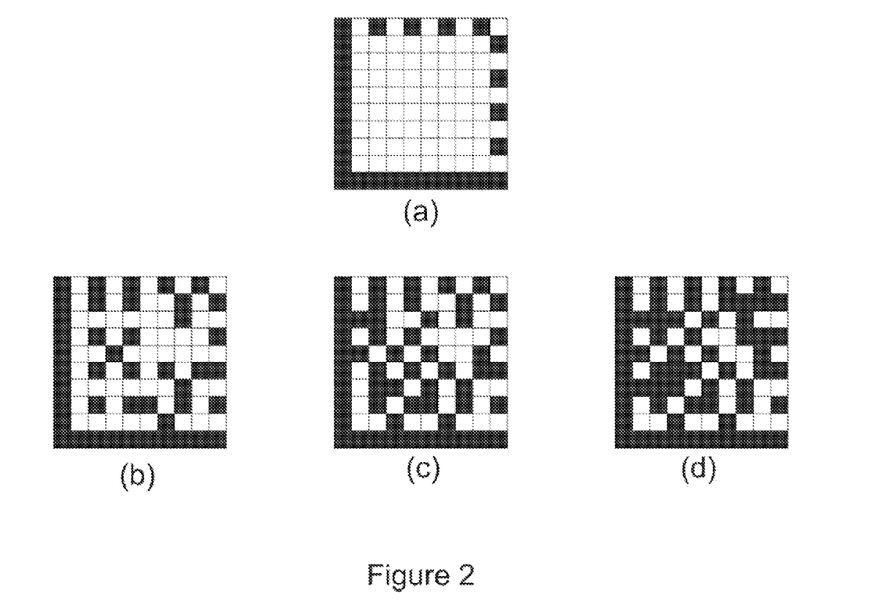
FIG. 2 illustrates an example identifier and an example progression.

For example, referring now to FIG. 2, an example identifier is illustrated that may be used as an identifier. The example identifier of FIG. 2 is a two-dimensional, machine-readable, bar code having a plurality of regions (e.g., squares) that may be white or black. In other examples, additional colors may also be used. A blank template of the example identifier is illustrated in 2(a). In this regard, the template includes black squares along two adjacent sides and alternating black and white squares along the two other adjacent sides. This configuration may allow for orientation of the identifier by a machine reading the identifier, such as a scanner.

Referring now to FIGS. 2(b)-2(d), an example identifier is illustrated at various stages of a serialization flow. For example, FIG. 2(b) illustrates the identifier at a first stage, which in various examples may be a manufacturing stage. The identifier may be modified at a second stage (e.g., packaging stage) by changing additional white squares to black, as indicated in FIG. 2(c). The identifier may be similarly modified further at a third stage (e.g., retail stage), as illustrated in FIG. 2(d).

In various examples, the identifiers may have a representation as a string of characters. For example, the identifiers of FIG. 2 may be represented as a binary string of 0's and 1's. In other examples, the string of characters may include various other types of characters, such as lower case letters, upper case letters, numerals, and/or various other types of characters.

Figure 3:
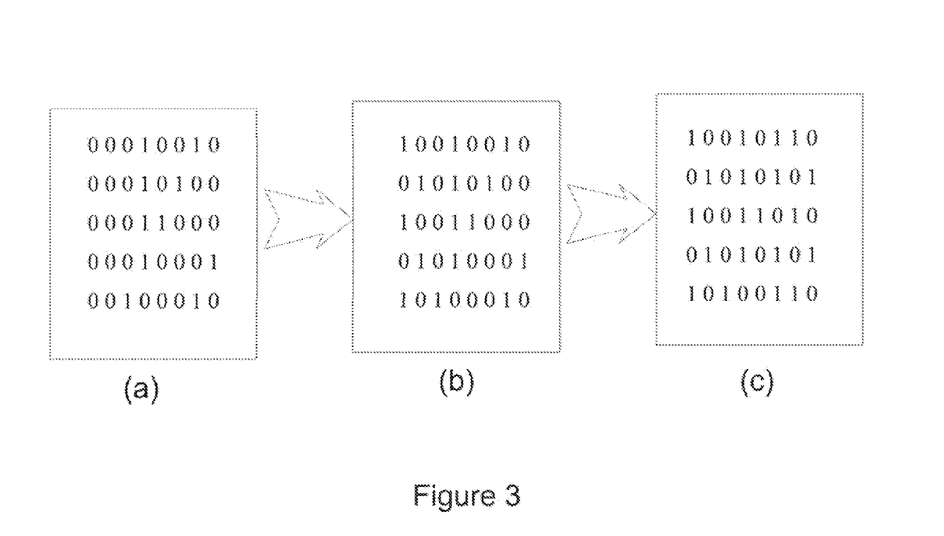
FIG. 3 illustrates an example progression of a binary representation of identifiers.

FIG. 3 illustrates an example identifier represented as a binary string of 0's and 1's. FIG. 3(a) illustrates and example set of identifiers at, for example, a first stage. For sake of simplicity, FIG. 3 illustrates a set including only five identifiers, each identifier being eight characters in length. Of course, those skilled in the art will appreciate that a set may include any number of identifiers and may have any selected length.

In various examples, each identifier in the set may be formed to have a predefined range of number of characters. For example, in the illustrated example of FIG. 3, the identifiers may be formed to have between 2 and 6 1's. Further, in various examples, at each stage of serialization, each identifier in the set may have a predetermined number, or a predetermined range of number, of 1's. In the illustrated example of FIG. 3(a), each identifier in the set has two 1's. At another stage in the serialization flow, each identifier in the set may have a different number or range of numbers of 1's, such as three 1's in the example of FIG. 3(b). Similarly, at still another stage in the serialization flow, each identifier may have still a different number or range of numbers of 1's, such as four 1's as illustrated in the example of FIG. 3(c).

Organizing the mass serialized numbers according to the number of certain characters provides various advantages. For example, searching of a database of identifiers can be accelerated significantly. In this regard, in various examples, a database of identifiers for a mass serialization may be searched based at least in part on a number of one of the characters in the representation (e.g., a binary string representation) of the identifiers. In one example, the database may be searched for a number or a range of number of 1's in a binary representation of the identifiers. Such searching based on the number or a range of number of characters may be performed in conjunction with other types of searching. For example, searching may also be performed based on a value of a selected byte in the binary representation, such as the first byte of a multi-byte representation.

For a large set of identifiers, as may be desirable for a mass serialization, avoidance of collisions (e.g., two or more supposedly unique identifiers being identical) can be of great importance. In this regard, the odds of any two mass serialized strings colliding is:

$$\frac{1}{\sum_{p=L}^{p=U}\binom{B}{p}}$$

The probability of a newly-generated random mass serialization string colliding with an existing set of M unique strings, $p_{collision}$, is:

$$p_{collision} = \frac{M}{\sum_{p=L}^{p=U}\binom{B}{p}}$$

The odds of having one or more collisions in a randomly-generated batch of M new strings can now be determined. As above, the number of mass serialized values can be computed from:

$$n_{MS} = \sum_{p=L}^{p=U}\binom{B}{p}$$

The probability of a collision, $p_{collision}$, is simply 1 minus the odds of no collision:

$$p_{collision} = 1.0 - \prod_{i=1}^{M}\left(1 - \frac{i-1}{n_{MS}}\right)$$

For example, suppose $n_{MS}$=16 and three mass serialized strings are desired. The odds of no collision are 15/16 when creating the second string and 14/16 when creating the third string (assuming the first two did not collide). Thus, $p_{collision}$=(15/16)(14/16)=210/256, in agreement with the equation above.

In some examples, inference forward may be desired using an IIO approach described above with reference to FIGS. 2 and 3. In this regard, inference refers to associating of related objects in a mass serialized set. Conventionally, inference may be achieved through association within a database. In accordance with various examples, inference may be built-in with the mass serialization and serialization flow.

Suppose integers K, J and B are defined by K<J<B, where B is the number of bits in the string and K and J are the number of 1's at progression states n and n+1. In various examples, n and n+1 may refer to various stages in the serialization flow, such as manufacturing, packaging and retail, for example. Thus, the identifiers in the serialization may progress from K 1's in the string to J 1's in the string from state n to state n+1. For example, as described in the example of FIG. 3 above, the number of 1's progresses from 2 in FIG. 3(*a*) to 3 in FIG. 3(*b*).

The number of possible states at J given the state at K may therefore be defined as S(K→J):

$$S(K \rightarrow J) = \binom{B-K}{B-J} = \frac{(B-K)!}{(B-J)!(J-K)!}$$

Suppose B=8, J=6 and K=4, then S(K→J)=6. Looking backwards from J to K, however, every state with J 1's may have arisen from the number of states with K 1's defined as S(K←J) given by:

$$S(K \rightarrow J) = \binom{J}{K} = \frac{J!}{K!(J-K)!}$$

For the same combination of values, B=8, J=6 and K=4, we have S(K→J)=15. Note that, in general, S(K→J)≠S(K←J), and the ratio is defined by:

$$S(K \leftarrow J)/S(K \rightarrow J) = \frac{\binom{J}{K}}{\binom{B-K}{B-J}} \prod_{i=K+1}^{J} \left(\frac{B-i+1}{i}\right)$$

This ratio depends on the relative sizes of J, K and B. It can be controlled to set the probabilities of guessing the valid values looking forward S(K→J) and looking backward S(K←J) to the desired low probabilities.

In one example of an IIO-based inference model, 40 bits for serialization may be used. Thus, there are $2^4$=1,099,511,627,776 different 40-bit binary strings. Table 1 records the number of combinations possible for every value of p, where p is the number of 1's in the 40-bit binary string. It is noted that well over half of the possible strings are in the range p={18 . . . 22}. In the example of Table 1, the range p={19, 20, 21} is used to uniquely serialize a set of products, providing more than $4 \times 10^{11}$ combinations available. Thus, if 10 million products are to be labeled in this serialization, the odds of guessing a legitimate serial identifier is still only 1 in 40,000. In addition to this serialization, an incremental information set (having full inference) having four states is added, which uses p=15, 18, 22 and 25. Each of these p-values corresponds to at least 40 billion workflows, meaning if 10 million workflows are eventually supported by this inference set, the odds of guessing a legitimate state at any state of the workflow is less than 1 in 4,000.

TABLE 1

| p | $C_{40,p}$ | Data Set Usage | % Combinations |
|---|---|---|---|
| 0 | 1 | | 0.00% |
| 1 | 40 | | 0.00% |
| 2 | 780 | | 0.00% |
| 3 | 9,880 | | 0.00% |
| 4 | 91,390 | | 0.00% |
| 5 | 658,008 | | 0.00% |
| 6 | 3,838,380 | | 0.00% |
| 7 | 18,643,560 | | 0.00% |
| 8 | 76,904,685 | | 0.01% |
| 9 | 273,438,880 | | 0.02% |
| 10 | 847,660,528 | | 0.08% |
| 11 | 2,311,801,440 | | 0.21% |
| 12 | 5,586,853,480 | | 0.51% |
| 13 | 12,033,222,880 | | 1.09% |
| 14 | 23,206,929,840 | | 2.11% |
| 15 | 40,225,345,056 | Inference Set 1 State 1 | 3.66% |
| 16 | 62,852,101,650 | | 5.72% |
| 17 | 88,732,378,800 | | 8.07% |
| 18 | 113,380,261,800 | Inference Set 1 State 2 | 10.31% |
| 19 | 131,282,408,400 | Mass Serialization Set 1 | 11.94% |
| 20 | 137,846,528,820 | Mass Serialization Set 1 | 12.54% |
| 21 | 131,282,408,400 | Mass Serialization Set 1 | 11.94% |
| 22 | 113,380,261,800 | Inference Set 1 State 3 | 10.31% |
| 23 | 88,732,378,800 | | 8.07% |
| 24 | 62,852,101,650 | | 5.72% |
| 25 | 40,225,345,056 | Inference Set 1 State 4 | 3.66% |
| 26 | 23,206,929,840 | | 2.11% |
| 27 | 12,033,222,880 | | 1.09% |
| 28 | 5,586,853,480 | | 0.51% |
| 29 | 2,311,801,440 | | 0.21% |
| 30 | 847,660,528 | | 0.08% |
| 31 | 273,438,880 | | 0.02% |
| 32 | 76,904,685 | | 0.01% |
| 33 | 18,643,560 | | 0.00% |
| 34 | 3,838,380 | | 0.00% |
| 35 | 658,008 | | 0.00% |
| 36 | 91,390 | | 0.00% |
| 37 | 9,880 | | 0.00% |
| 38 | 780 | | 0.00% |
| 39 | 40 | | 0.00% |
| 40 | 1 | | 0.00% |
| SUM | 1,099,511,627,776 | One Inference Set, One Mass Serialization Set | 100.0% |

Thus, for example, in moving from p=15 to p=18, for example, there are 25!/22!3!=2300 possible next states. Similarly, in moving from p=18 to p=22, there are 22!/18!4!=7315 possible next states. Finally, in moving from p=22 to p=25, there are 18!/15!3!=816 possible next steps.

The p-bands can themselves be assigned to sub-bands based on the values of individual bytes. As noted above, a database search may be performed based on the number of 1's (p value) as well as the value of a particular bye in a multi-byte string. In the example of Table 1 above, 40 bits is equivalent to five bytes. Thus, a column-based data look-up indexed on the first byte may be used to sub-divide the search for collisions in the database into 256 sub-bands.

Figure 4:
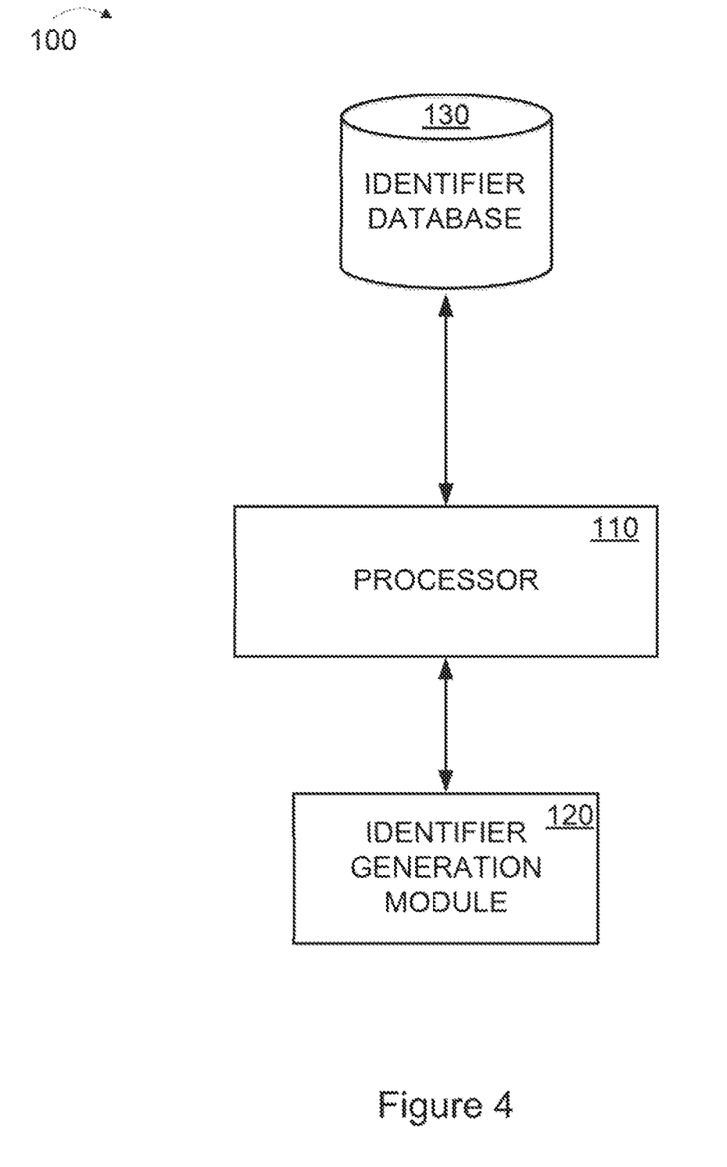
FIG. 4 illustrates an example system for generation of identifiers.

Referring now to FIG. 4, an example system is schematically illustrated. The example system of FIG. 4 may be used to generate a mass serialization set. The example system 100 includes a processor 110 that can perform various functions and may be interfaced with various other components.

The processor 110 may be coupled to an identifier generation module 120 which is configured to generate identifiers for a mass serialization set, for example. In various examples, the identifier generation module 120 may be a separate processor or may be a module embedded within the processor 110.

The identifier generation module 120 may generate a set of identifiers, either as a complete set, as individual identifiers, or as groups of identifiers, for mass serialization. The generated identifiers may be, for example, bar codes, 2-dimensional bar codes or other types of identifiers. In generating the identifiers, the identifier generation module 120 may select identifiers that have a representation as a string of characters. As noted above, the characters may be, for example, lower case letters, upper case letters, and/or numerals. In one example, the representation is a binary string of 0's and 1's.

The length of the string of the representation may be predetermined. For example, in the above-described example of Table 1, the identifiers are represented by a binary string of 40 characters. Further, the representation of each identifier may include a number of a certain character within a predefined range. For example, as noted above with the example of Table 1, in a 40-character string, the number of 1's may be selected to be between 19 and 21.

Further, the number (or range of numbers) of the character may be different for each of a plurality of stages of a serialization flow. For example, the number of 1's at one stage may be different from the number of 1's at another stage.

The system 100 may further include a storage device, such as an identifier database 130. The processor 110 may receive the set of identifiers form the identifier generation module 120 and store them in the identifier database 130. The processor 110 may further be coupled to various other devices or interfaces (e.g., a communication interface) and may provide the set of identifiers to other components through such devices or interfaces, for example.

Figure 5:
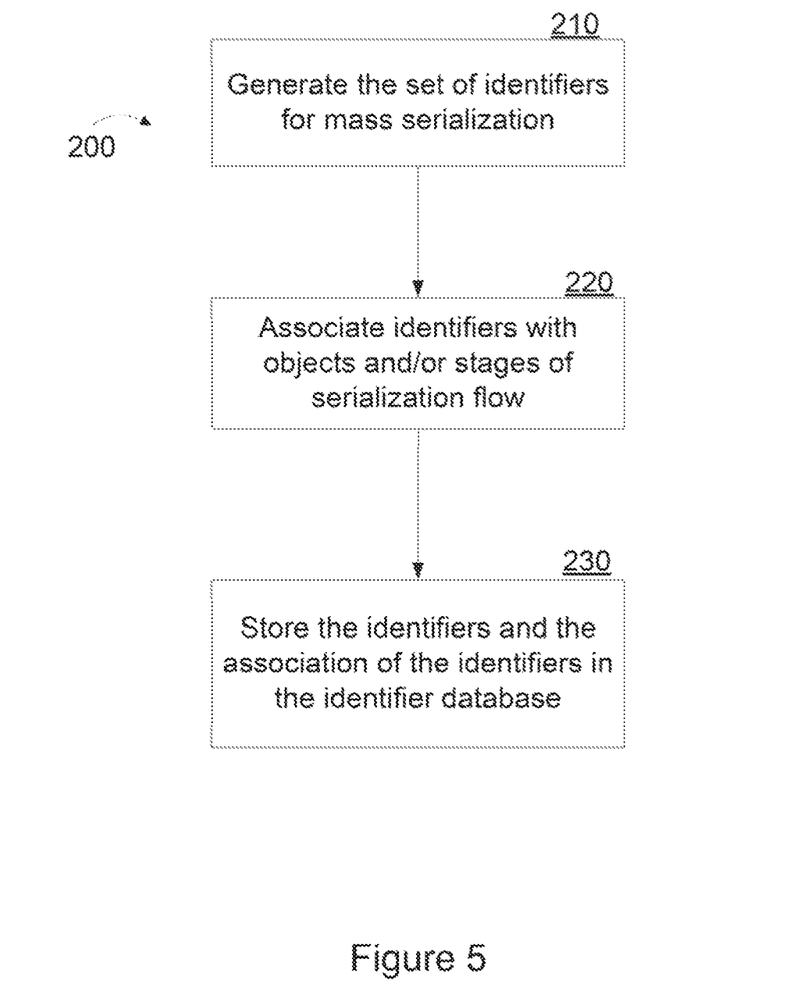
FIG. 5 is a flow chart illustrating an example method.

Referring now to FIG. 5, flow chart illustrates an example method 200. In the example method 200, a set of identifiers for a mass serialization is generated (block 210). In this regard, the set of identifiers may be generated by an identifier generation module 120 described above with reference to FIG. 4, for example. As noted above, each identifier in the set of identifiers may have a representation of at least two different characters, such as a binary representation of 0's and 1's. Further, the representation of each identifier in the set may have a predetermined length. For example, as described above, the representation may be a binary string of 40 characters. In various examples, the number of one of the characters in the representation may be within a predefined range. For example, the number of 1's in the 40-character binary string may be set between 19 and 21 in the example of Table 1 above.

The identifiers in the generated set of identifiers may be associated with objects and/or stages of serialization that may be associated with the objects (block 220). For example, the various identifiers in the generated set may be associated with objects for retail and/or different stages of the objects flow (e.g., manufacturing, packaging, etc.).

The generated set of identifiers and the association of the identifiers to objects and/or stages of serialization may be stored in, for example, the identifier database 130 of FIG. 4 (block 230).

Thus, identifiers for a mass serialization may be provided that provide for avoiding collisions and accelerated lookup of the serialization value in a database.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present invention and its practical application to enable one skilled in the art to utilize the present invention in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
   a processor; and
   a memory device including computer program code, the memory device and the computer program code configured to, with the processor, cause the apparatus to perform at least the following:
   determine a plurality of characters for creating identifier representations;
   determine a range of how many of a certain character of the plurality of characters are to be included in the identifier representations;
   generate a set of identifiers, each identifier in the set of identifiers having a representation of the identifier representations, wherein the representation of each identifier comprises the plurality of characters, and a number of the certain character in the representation is within the range;
   store the set of identifiers in the memory; and
   affix an identifier from the set of identifiers to packaging for an object or the object.

2. The apparatus of claim 1, wherein the plurality of characters comprise binary representation of 0's and 1's.

3. The apparatus of claim 2, wherein the certain character is the binary 1 representation, and the range specifies how many binary 1 representations are to be included in each identifier.

4. The apparatus of claim 3, wherein the memory device and the computer program code are configured to cause the apparatus to further perform at least the following:
set the number of binary 1 representations within the range at a different number for each of a plurality of stages of a serialization flow.

5. The apparatus of claim 4, wherein the plurality of stages correspond to supply chain stages.

6. A computer-implemented method, comprising:
generating, by at least one processor, a set of identifiers for a mass serialization;
associating, by the at least one processor, one or more of the identifiers of the set of identifiers with an object; and
storing, by the at least one processor, the set of identifiers and an association of the one or more identifiers with an object, wherein each identifier in the set of identifiers has a representation comprising at least a first character and a second character, and the representation includes a plurality of the first character and a plurality of the second character,
storing, by at least one processor, a range of how many of the first characters are to be included in the representation of each identifier, wherein the representation of each identifier includes a number of the first characters within the range; and
affixing an identifier from the set of identifiers to packaging for an object or the object.

7. The method of claim 6, wherein the first character and the second character comprise binary representation of 0's and 1's.

8. The method of claim 7, wherein a number of the binary 1 representations in the representation is within the predefined range.

9. The method of claim 8, further comprising:
setting the number of binary 1 representations within the range at a different number for each of a plurality of stages of a serialization flow.

10. The method of claim 9, wherein the plurality of stages correspond to supply chain stages.

11. A computer program product, embodied on a non-transitory computer-readable medium, wherein the computer program product is executable by a processor to:
determine a plurality of characters for creating identifier representations;
determine a range of how many of a certain character of the plurality of characters are to be included in the identifier representations;
generate a set of identifiers, each identifier in the set of identifiers having a representation of the identifier representations, wherein the representation of each identifier comprises the plurality of characters, and a number of the certain character in the representation is within the range;
store the set of identifiers in a database;
search the database for a mass serialization,
wherein the searching of the database is based at least in part on a number of the certain character in the representation of each identifier; and
affix an identifier from the set of identifiers to packaging for an object or the object.

12. The computer program product of claim 11, wherein the plurality of characters comprise a binary representation of 0's and 1's.

13. The computer program product of claim 12, wherein the computer program product is executable by the processor to:
search the database based on a value of a selected byte of a binary representation.

14. The computer program product of claim 12, wherein a number of the binary 1 representations is within a predefined range.

15. The computer program product of claim 14, wherein the number of binary 1 representations within the range is a different number for each of a plurality of stages of a serialization flow.

* * * * *